VERNER F. ROGERS
INVENTOR

Feb. 25, 1941.  V. F. ROGERS  2,233,359
OIL SEAL WITH CENTRAL SEALING EDGE
Filed Jan. 28, 1939  2 Sheets-Sheet 2

VERNER F. ROGERS
INVENTOR
PER

ATTORNEY

Patented Feb. 25, 1941

2,233,359

UNITED STATES PATENT OFFICE 2,233,359

OIL SEAL WITH CENTRAL SEALING EDGE

Verner F. Rogers, Chicago, Ill., assignor to Victor Manufacturing & Gasket Company, Chicago, Ill., a corporation of Illinois Application January 28, 1939, Serial No. 253,333

3 Claims. (Cl. 288—3)

This invention relates to an improved oil seal with central sealing edge and has, for one of its principal objects, the provision of a seal adapted to be applied to a rotating shaft for the prevention of fluid leakage therearound and which seal can be economically manufactured in production quantities and at the same time produce a very simple yet efficient structure.

One of the important objects of this invention is to provide a fluid seal of the class described wherein the portion or sealing edge which actually contacts the rotating or rotatable shaft is of considerably less effective area than has heretofore been thought possible, but which, at the same time, will produce as good or even a better sealing effect than has been accomplished in such a sealing device previously known and made.

Another important object of the invention is to provide, in a fluid seal, a structural design wherein the device has an automatic tension continually applied directly above the effective sealing area, which automatic action can be supplemented or augmented by mechanical means such as a garter spring.

A further important object resides in the production of a fluid seal which, while made in one piece, has an open inner structure adapted to provide more resiliency and flexibility for the actual sealing lip and which further can be employed to accommodate a garter spring or supplemental tensioning element.

A still further object is the inclusion in a plastic fluid seal of stiffening or supporting means of metal or the like, which supporting means may or may not be employed to supplement or augment the sealing action, particularly so far as a sealing contact with a housing which surrounds the rotatable shaft is concerned.

An additional object is the provision of an all plastic fluid seal composed of molded synthetic rubber or the like which, on account of its own inherent characteristics, will properly and tightly fit into a relatively fixed housing surrounding a rotatable shaft and, at the same time, provide an adequate sealing relationship with the shaft itself.

Other and further important objects of the invention will be apparent from the disclosures in the accompanying drawings and following specification.

The invention, in a preferred form, is illustrated in the drawings and hereinafter more fully described.

In the drawings:

Figure 10 shows still another modification wherein the two normally separate outer edges of the seal are held together by a series of rivets or the like.

As shown in the drawings:

Figure 1:
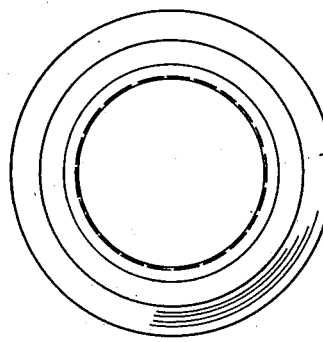
Figure 1 is a side elevation of the improved fluid seal of this invention.

The reference numeral 12 indicates generally the body portion of the improved fluid seal of this invention, the same being composed of some plastic material such as vulcanized synthetic rubber and being annular in shape to correspond to the usual housing which surrounds the rotatable shafts to which seals of this type are ordinarily applied.

Figure 2:
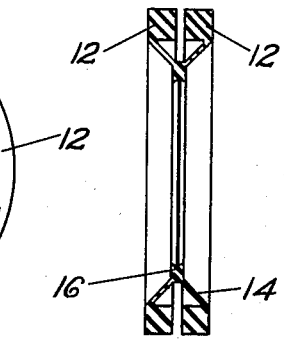
Figure 2 is a sectional view taken diagrammatically through Figure 1 at any point.
Figure 3:
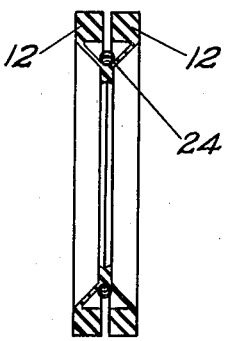
Figure 3 is a sectional view similar to Figure 2 but showing the application of a supplemental constricting element into the seal itself.
Figure 4:
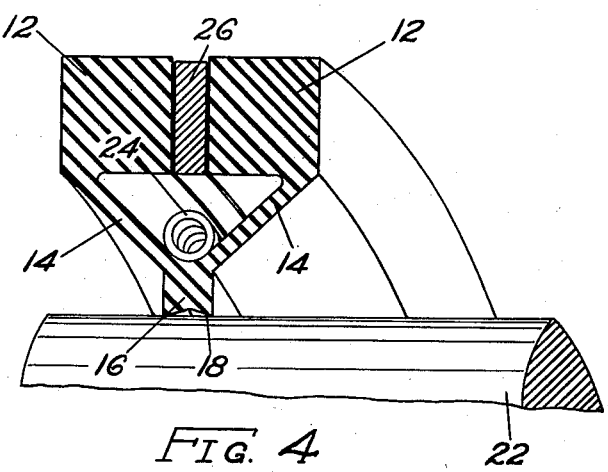
Figure 4 is an enlarged sectional view of the seal of Figure 2, illustrating a stiffening element applied thereto.
Figure 6:
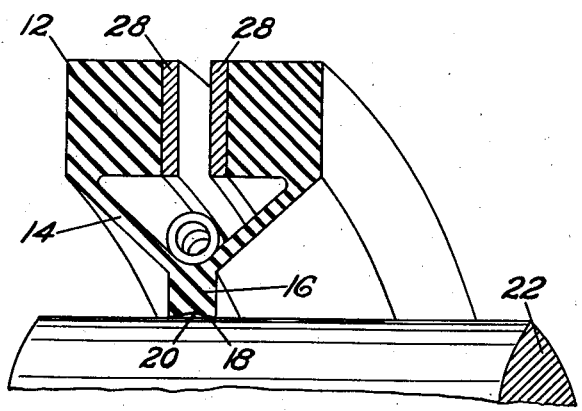
Figure 6 illustrates a modification of the invention wherein two metal washers are employed as stiffening elements for the seal.

From an inspection of Figures 2, 3 and 4, it will be noted that there are two opposed body portions 12, each substantially square in cross-section, the same being integrally joined together by means of depending angularly positioned webs 14 which terminate in a single common unitary sealing lip 16. As best shown in Figures 4 and 6, this sealing lip 16 has opposed angularly formed edges 18, leaving a central groove 20 which ordinarily acts for better sealing relationship with a shaft 22.

In Figure 3, a garter spring 24 is employed which supplements the natural resiliency of the synthetic rubber itself and may be said to produce a better sealing contact. However, this may be omitted from the structure as shown in Figure 2 and with perfectly satisfactory results.

Figure 5:
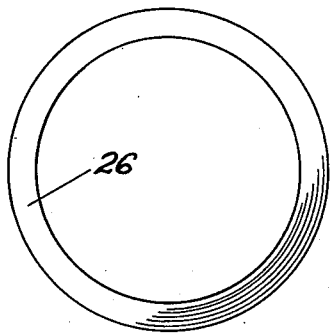
Figure 5 is a plan view of the washer used as a stiffening element of Figure 4.

In Figure 4, a stiffening washer 26 is placed in the space between the two opposed body portions 12, this washer being illustrated in a side view at Figure 5 and as shown in Figure 4 is of a lesser external diameter than the normal external diameter of the body portions 12 so that no actual contact with a surrounding housing is necessary. It has been found by experiments that the sealing relationship of the synthetic rubber with the inner face of the ordinary metal housing is sufficient to effectively provide against leakage, and, at the same time, undesirable rotation in the housing is avoided. However, for some purposes, the stiffening washer 26 may be employed, thereby supplementing the all plastic type of seal shown in Figure 2.

As best illustrated in Figure 6, two metal washers 28 may be employed, and if desired, these may be made of the same diameter as the outer diameter of the body portions 12 wherein an actual metal-to-metal contact between these washers and the surrounding housing results. This, of course, produces a somewhat stiffer seal and one wherein any possibility of leakage either at the points of shaft contact or housing contact is definitely avoided. The washers 28 are usually applied to the inner face of the body portions 12 by adhesion during the vulcanizing process, while the washer 26 is ordinarily simply loosely fitted into the space between the opposed faces of the elements 12.

Figure 7:
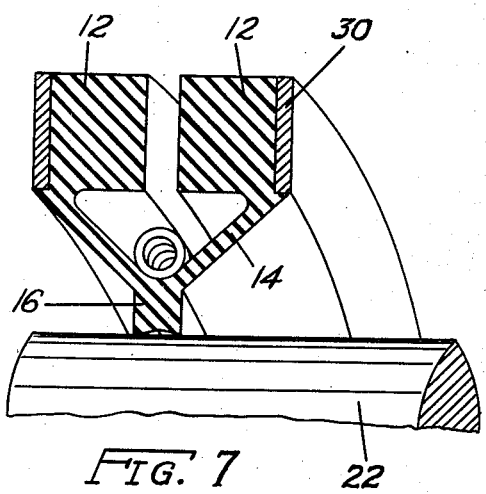
Figure 7 is a further adaptation of Figure 6 wherein the metal washers are employed in a different relationship.

In Figure 7, the body portions 12 are shown as reinforced or supplemented with outer metallic facing washers 30 also preferably vulcanized thereto during the actual operation of producing the seal itself. The other portions of the seal 14, 16, etc., remain unchanged.

It is noted in passing, however, that the angular relationship of the webs 14 to the main body portion 12 and with respect to each other may be changed to produce more or less flexibility, and the actual thickness and dimensions of the webs may also be correspondingly altered to meet varying conditions.

Figure 8:
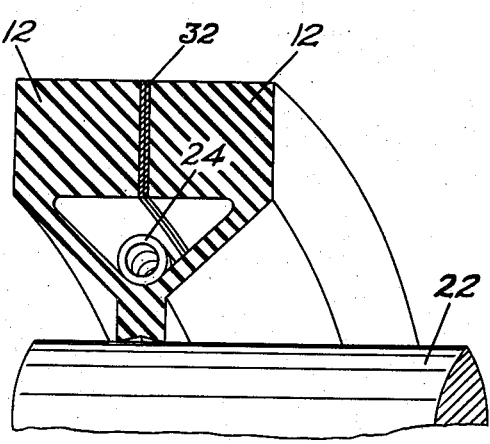
Figure 8 shows a further modification of the invention wherein a completely plastic yet integral seal is produced.

In Figure 8, the opposed body portions 12 of the seal proper are shown joined together after the garter spring 24 has been inserted into the seal by means of a layer of adhesive 32, this adhesive being obviously some rubber cement either with or without a layer of fabric or some other material which might be employed according to the desire or needs of the manufacturer.

Figure 9:
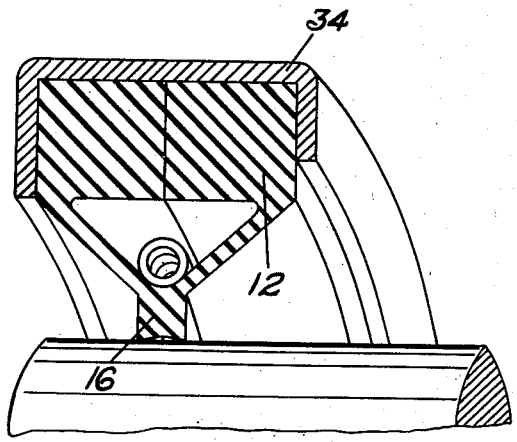
Figure 9 illustrates another embodiment of the invention; the same including the use of an outer supporting metallic shell.

Figure 9 illustrates the seal of this invention incased in an outer metal shell 34 which produces a structure which might be considered as more desirable for heavy duty and which can, of course, be actually driven with a pressed fit into a surrounding housing without any danger of damaging the seal structure itself. Ordinarily, however, in the case of the flexible all plastic seals or the seal of Figure 4, the same can simply be pushed into the housing with the fingers or hands of the operator, and thereafter remains definitely fixed in desired position.

Figure 10:
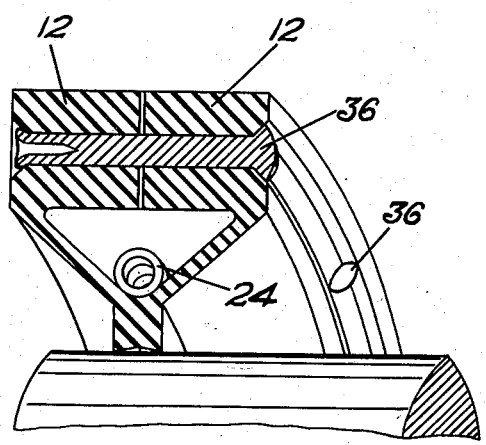

A further type is illustrated in Figure 10 wherein the body portions 12 are jointed together by means of a series of rivets 36 spaced at intervals around the periphery of the seal, thereby providing a somewhat stiffer construction and one from which the garter spring 24 cannot possibly become lost.

It will be obvious that other modifications and embodiments of the invention may be provided as conditions warrant or occasion demands but that the main object here is to provide either an all-plastic or practically all-plastic seal which can be produced by a simple molding operation from synthetic rubber and wherein the shaft sealing edge is so centrally located that there is never any danger of distortion and consequent leakage which sometimes results from the use of seals which employ cup-shaped elements composed of either leather or various types of synthetic rubber. Furthermore, the device has a sufficiently heavy body portion so as to enable its application directly to a housing without any stiffening structure and the relationship of the web portions which join the sealing edge to the body portions is such that a tension on the sealing edge always results, which, however, as shown may be supplemented by mechanical means such as the garter spring. Furthermore, the body portions may additionally be supplemented by stiffening elements such as rings or other devices shown, and in the case of heavy work, these have been found advantageous.

I am aware that many changes may be made and numerous details of construction varied throughout a wide range without departing from the principles of this invention, and I, therefore, do not purpose limiting the patent granted hereon otherwise than as necessitated by the prior art.

I claim as my invention:

1. A unitary fluid seal for rotatable shafts, comprising an outer relatively wide body portion adapted for sealing contact with a housing surrounding a shaft and including a centrally disposed relatively thin sealing edge for shaft contact, the body portion being formed in two similar opposed halves, and an angularly disposed web extending from each body portion to the central sealing edge, the body portions themselves being separated a distance slightly less than the effective width of the sealing edge, and a supplemental stiffening element mounted between opposed faces of the body portions.

2. A unitary fluid seal for rotatable shafts, comprising an outer relatively wide body portion adapted for sealing contact with a housing surrounding a shaft and including a centrally disposed relatively thin sealing edge for shaft contact, the body portion being formed in two similar opposed halves, and an angularly disposed web extending from each body portion to the central sealing edge, the body portions themselves being separated a distance slightly less than the width of the sealing edge, and a supplemental stiffening element mounted between opposed faces of the body portions, said stiffening element comprising a metallic washer.

3. A unitary fluid seal for rotatable shafts, comprising an outer relatively wide body portion adapted for sealing contact with a housing surrounding a shaft and including a centrally disposed relatively thin sealing edge for shaft contact, the body portion being formed in two similar opposed halves, and an angularly disposed web extending from each body portion to the central sealing edge, the body portions themselves being separated a distance slightly less than the width of the sealing edge, and a supplemental stiffening element mounted between opposed faces of the body portions, said stiffening element comprising a pair of metallic washers, one washer vulcanized to each inner face of a body portion.

VERNER F. ROGERS.